US011128134B2

(12) United States Patent
Vardharajan

(10) Patent No.: US 11,128,134 B2
(45) Date of Patent: Sep. 21, 2021

(54) METHODS AND DEVICES TO REALIZE POWER PHASE LOAD BALANCING USING A SOFTWARE CONTROLLED POWER SWITCH MATRIX IN A POWER DISTRIBUTION UNIT

(71) Applicant: AT&T Intellectual Property I, L.P., Atlanta, GA (US)

(72) Inventor: Satya Vardharajan, San Diego, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 110 days.

(21) Appl. No.: 16/113,503

(22) Filed: Aug. 27, 2018

(65) Prior Publication Data

US 2020/0067311 A1 Feb. 27, 2020

(51) Int. Cl.
*H02J 3/14* (2006.01)
*G05B 13/02* (2006.01)
*H02J 13/00* (2006.01)

(52) U.S. Cl.
CPC ............ *H02J 3/14* (2013.01); *G05B 13/0265* (2013.01); *H02J 13/0017* (2013.01); *H02J 2203/20* (2020.01)

(58) Field of Classification Search
CPC .... H02J 3/14; H02J 13/0017; H02J 2003/007; G05B 13/0265
See application file for complete search history.

(56) References Cited

U.S. PATENT DOCUMENTS

| 7,209,839 | B2 | 4/2007 | Roytelman et al. |
| 8,121,740 | B2 | 2/2012 | Yang et al. |
| 8,494,661 | B2 | 7/2013 | McGlumphy et al. |
| 8,750,393 | B1 * | 6/2014 | Alshinnawi .......... H05K 7/1492 375/257 |
| 8,836,175 | B1 | 9/2014 | Eichelberg |
| 8,935,010 | B1 | 1/2015 | Okamura et al. |
| 8,959,006 | B2 * | 2/2015 | Nasle .................. G06F 17/5009 703/2 |
| 9,575,531 | B2 | 2/2017 | Inbaraj et al. |
| 9,703,342 | B2 | 7/2017 | Nicholson et al. |
| 9,891,682 | B1 * | 2/2018 | Czamara ................. G06F 1/266 |

(Continued)

*Primary Examiner* — Rocio Del Mar Perez-Velez
*Assistant Examiner* — Vi N Tran
(74) *Attorney, Agent, or Firm* — Guntin & Gust, PLC; Matthew Bruce Tropper

(57) ABSTRACT

Aspects of the subject disclosure may include, for example, embodiments detecting and correcting load imbalance on power supply phases within a managed scope using a software controlled power switch matrix that is resident in each power distribution unit supplying power in the managed scope. Managed scope could include a plurality of power distribution units supplying a plurality of circuit or equipment loads in a plurality of premises. On each PDU, the software controlled switch matrix maintains and changes physical coupling of power supply phases to circuit and equipment loads. Further embodiments include correcting power supply phase load imbalances through software commands to adjust the coupling of power supply phases to circuit or equipment loads. Embodiments are intended to help power administrators maintain power supply phase load balance effectively in a managed scope. Other embodiments are disclosed.

20 Claims, 9 Drawing Sheets

(56) References Cited

U.S. PATENT DOCUMENTS

| | | | |
|---|---|---|---|
| 2011/0066258 A1* | 3/2011 | Torzhkov | G05B 13/042 |
| | | | 700/29 |
| 2011/0101777 A1* | 5/2011 | Jansma | H02J 1/14 |
| | | | 307/38 |
| 2012/0022713 A1* | 1/2012 | Deaver, Sr. | G05B 17/02 |
| | | | 700/298 |
| 2012/0316691 A1* | 12/2012 | Boardman | H02J 3/26 |
| | | | 700/293 |
| 2013/0218497 A1* | 8/2013 | Stanlake | H02J 3/26 |
| | | | 702/65 |
| 2015/0006440 A1* | 1/2015 | Nicholson | G06N 5/04 |
| | | | 706/11 |
| 2016/0048185 A1 | 2/2016 | Liang et al. | |
| 2017/0032600 A1* | 2/2017 | Roth | G07C 9/00174 |
| 2017/0093161 A1 | 3/2017 | Kocarev et al. | |
| 2017/0149243 A1* | 5/2017 | Dozier | G06F 1/28 |

* cited by examiner

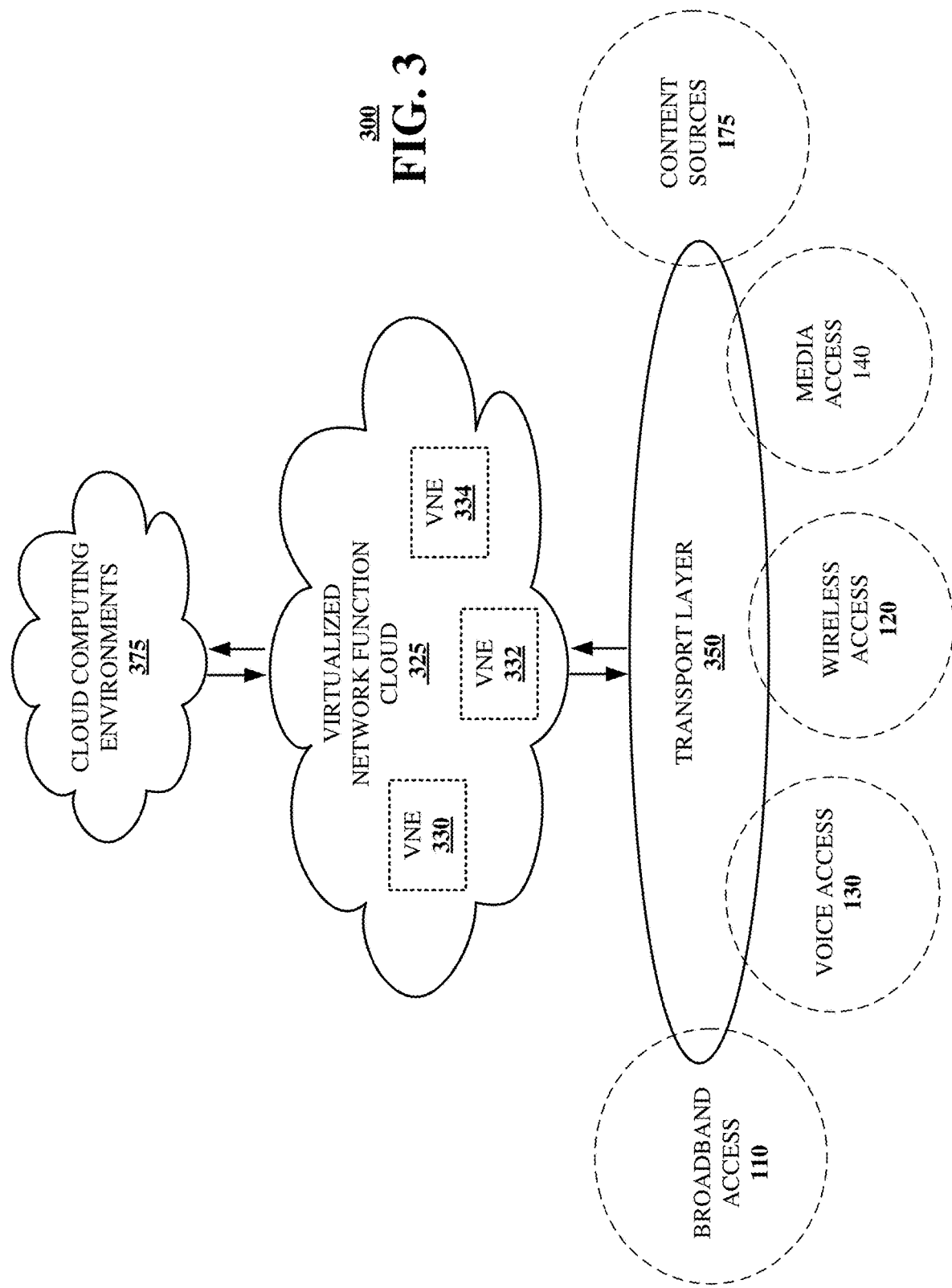

mbedded therein, and a central power distribution controller (CPDUC), a managed scope of the CPDUC comprises the plurality of PDUs supplying a plurality of circuits or equipment loads in a plurality of premises, operations of the CPDUC comprise receiving phase load data from the LPDUC for each power socket of each PDU located in the managed scope, generating an aggregate power phase load profile for one or more of three power supply phases powering the managed scope based on the phase load data received from the LPDUC for each power socket of each PDU located in the managed scope, detecting a power phase load imbalance within the managed scope, and providing instructions to at least one LPDUC to change a power phase coupled to the plurality of circuits or equipment loads supplied by at least one of the plurality of PDUs within the managed scope to improve the power phase load imbalance in real time. The at least one LPDUC utilizes the SCPSM to change a physical coupling of the power phase to the plurality of circuits or equipment loads without a need for a power down of the plurality of circuits or equipment loads supplied through the affected PDU affected by the phase coupling changes. Other embodiments are described in the subject disclosure.

METHODS AND DEVICES TO REALIZE POWER PHASE LOAD BALANCING USING A SOFTWARE CONTROLLED POWER SWITCH MATRIX IN A POWER DISTRIBUTION UNIT

FIELD OF THE DISCLOSURE

The subject disclosure relates to a methods and devices for adjusting loading of power phases using a software controlled power matrix.

BACKGROUND

Operations centers for telecommunication services providers or data services providers include premises equipment that are coupled to power (e.g. three-phase power). Premises equipment can be stored in cabinets at each of the operations centers. Further, premises equipment comprises cards that carry electronic devices such as servers or storage devices that provide various services (e.g. video content, media content, social media, email, streaming, etc.). Each card is coupled to a socket on the cabinet and is provided power by a power distribution unit. An aggregation of cards/premises equipment via their respective sockets can comprise one or more loads on phases supplied by the power distribution unit resulting in the power distribution unit carrying several loads of power. However, if there is a load imbalance, a circuit breaker on the power distribution unit may be tripped powering down the premises equipment and discontinuing operation of telecommunication services or data services, accordingly.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
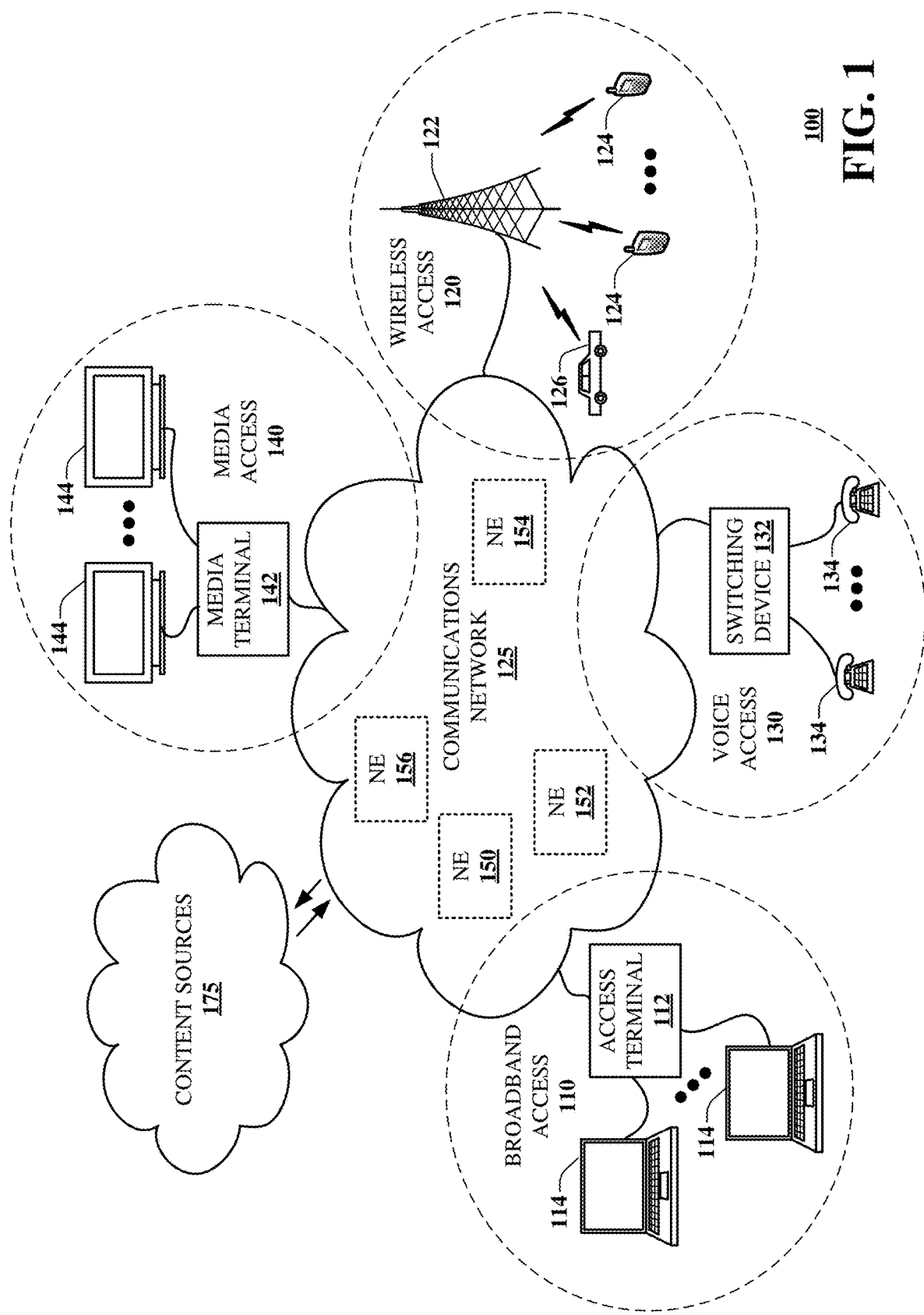
FIG. 1 is a block diagram illustrating an example, non-limiting embodiment of a communications network in accordance with various aspects described herein.

The subject disclosure describes, among other things, illustrative embodiments for a system comprising a plurality of power distribution units (PDUs), each of the PDUs comprising a local power distribution controller (LPDUC) embedded therein, each of the PDUs comprising a software controlled power switch matrix (SCPSM) (SCPSM can be implemented in hardware through an ASIC chip) embedded therein, and a central power distribution controller (CPDUC), a managed scope of the CPDUC comprises the plurality of PDUs supplying a plurality of circuits or equipment loads in a plurality of premises, operations of the CPDUC comprise receiving phase load data from the LPDUC for each power socket of each PDU located in the managed scope, generating an aggregate power phase load profile for one or more of three power supply phases powering the managed scope based on the phase load data received from the LPDUC for each power socket of each PDU located in the managed scope, detecting a power phase load imbalance within the managed scope, and providing instructions to at least one LPDUC to change a power phase coupled to the plurality of circuits or equipment loads supplied by at least one of the plurality of PDUs within the managed scope to improve the power phase load imbalance in real time. The at least one LPDUC utilizes the SCPSM to change a physical coupling of the power phase to the plurality of circuits or equipment loads without a need for a power down of the plurality of circuits or equipment loads supplied through the affected PDU affected by the phase coupling changes.

One or more aspects of the subject disclosure include a system. The system comprising a plurality of power distribution units (PDUs), each of the PDUs comprising a local power distribution controller (LPDUC) embedded therein, each of the PDUs comprising a software controlled power switch matrix (SCPSM) embedded therein, and a central power distribution controller (CPDUC). A managed scope of the CPDUC comprises the plurality of PDUs supplying a plurality of circuits or equipment loads in a plurality of premises. Operations of the CPDUC comprise receiving phase load data from the LPDUC for each power socket of each PDU located in the managed scope, generating an aggregate power phase load profile for one or more of three power supply phases powering the managed scope based on the phase load data received from the LPDUC for each power socket of each PDU located in the managed scope, detecting a power phase load imbalance within the managed scope, and providing instructions to at least one LPDUC to change a power phase coupled to the plurality of circuits or equipment loads supplied by at least one of the plurality of PDUs within the managed scope to improve the power phase load imbalance in real time. The at least one LPDUC utilizes the SCPSM to change a physical coupling of the power phase to the plurality of circuits or equipment loads without a need for a power down of the plurality of circuits or equipment loads supplied through the affected PDU affected by the phase coupling changes.

One or more aspects of the subject disclosure include a non-transitory, machine-readable medium, comprising executable instructions that, when executed by a processing system including a processor, facilitate performance of operations. The operations comprising receiving phase load data from a local power distribution controller (LPDUC) for each power socket of each power distribution unit (PDU) located in a managed scope. The CPDUC communicates with a plurality of power distribution units (PDUs), each of the PDUs comprising the LPDUC embedded therein, each of the PDUs comprising a software controlled power switch matrix (SCPSM) embedded therein. The managed scope of the CPDUC comprises the plurality of PDUs supplying a plurality of circuits or equipment loads in a plurality of premises. Further operations comprise generating an aggregate power phase load profile for one or more of three power supply phases powering the managed scope based on the phase load data received from the LPDUC for each power socket of each PDU located in the managed scope, detecting a power phase load imbalance within the managed scope, and providing instructions to at least one LPDUC to change a power phase coupled to the plurality of circuits or equipment loads supplied by at least one of the plurality of PDUs within the managed scope to improve the power phase load imbalance in real time. The at least one LPDUC utilizes the SCPSM to change a physical coupling of the power phase to the plurality of circuits or equipment loads without a need for a power down of the plurality of circuits or equipment loads supplied through the affected PDU affected by the phase coupling changes.

One or more aspects of the subject disclosure include a method. The method can include receiving, by a central power distribution controller (CPDUC), phase load data from a local power distribution controller (LPDUC) for each power socket of each power distribution unit (PDU) located in a managed scope. The CPDUC communicates with a plurality of power distribution units (PDUs), each of the PDUs comprising the LPDUC embedded therein, each of PDUs comprising a software controlled power switch matrix (SCPSM) embedded therein. The managed scope of the CPDUC comprises the plurality of PDUs supplying a plurality of circuits or equipment loads in a plurality of premises. Further, the method comprises generating, by the CPDUC, an aggregate power phase load profile for one or more of three power supply phases powering the managed scope based on the phase load data received from the LPDUC for each power socket of each PDU located in the managed scope, detecting, by the CPDUC, a power phase load imbalance within the managed scope, and providing, by the CPDUC, instructions to at least one LPDUC to change a power phase coupled to the plurality of circuits or equipment loads supplied by at least one of the plurality of PDUs within the managed scope to improve the power phase load imbalance in real time. The at least one LPDUC utilizes the SCPSM to change a physical coupling of the power phase to the plurality of circuits or equipment loads without a need for a power down of the plurality of circuits or equipment loads supplied through the affected PDU affected by the phase coupling changes.

Referring now to FIG. 1, a block diagram is shown illustrating an example, non-limiting embodiment of a communications network 100 in accordance with various aspects described herein. In one or more embodiments, communications network 100 comprises data centers that include equipment. Local power distribution unit controller(s) and central power distribution unit controller(s) provide and manage three phase power to the equipment to improve phase load imbalances.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
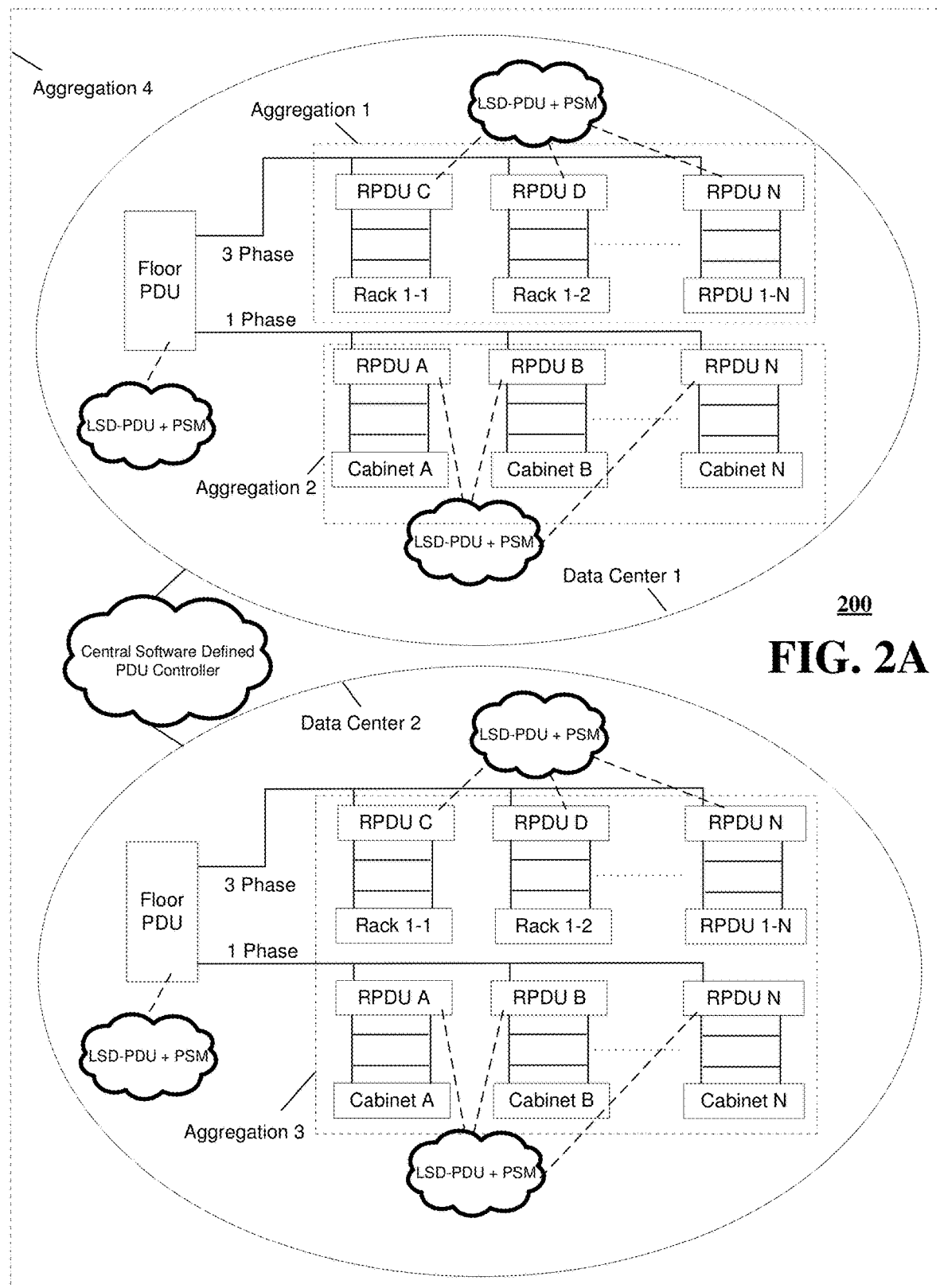
FIG. 2A-B—are block diagrams illustrating example, non-limiting embodiments of systems functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. In one or more embodiments, the system 200 includes two data centers (depicted as data center 1 and data center 2), each of which has multiple racks and multiple cabinets of equipment. Each data center can be geographically separate location. This equipment can include cards in the multiple racks or cabinets. Each card or several cards can be servers (video server, email server, content server, etc.) or storage devices (e.g. memory, databases, information repositories). Power is provided to each rack or cabinet through a rack power distribution unit (RPDU). The RPDU is provided power by a floor PDU on a floor of a data center. The floor PDU can provide three phase power to multiple RPDUs or single phase power to multiple RPDUs.

Each of the floor PDUs and RPDUs include a local software defined power distribution unit (LSD-PDU) controller and a software controlled power switch matrix (PSM) that controls the three phase power and the single phase power to the rack equipment or cabinet equipment. The local software defined power distribution unit controller can also be called a local power distribution controller (LPDUC). Further, a central software defined power distribution unit (CSD-PDU) controller controls power provided to the equipment in each data center including three phase power and single phase power. The central software defined power distribution unit controller can also be called the central power distribution controller (CPDUC).

Also, the CSD-PDU controller or CPDUC can manage the power (three phase or single phase) provided to the equipment in each data center according different aggregation levels (depicted as Aggregation 1-4). In one data center, a group of racks including RPDUs that are provided three phase power can be a first aggregation level (depicted as Aggregation 1). In the same data center, another group of cabinets including RPDUs that are provided single phase power can be a second aggregation level (depicted as Aggregation 2). In another data center, a group of racks including RPDUs and a group of cabinets including RPDUs, together, can be a third aggregation level (depicted as Aggregation 3). In addition, all the equipment in each data center can be in a fourth aggregation level (depicted as Aggregation 4).

The CPDUC is a device that shall detect and correct power phase load imbalances within its configurable scope of management. Further, the CPUDC resides in a central power monitoring/management location. There could be a plurality of power circuits or equipment, powered by a plurality of power distribution units (PDUs), resident in a plurality of premises that could be configured to be the management scope of the CPDUC. The management scope can contain different aggregation levels. In addition, the CPDUC shall communicate with the LPDUC to gather phase load data for each power socket of each PDU located in the managed scope and build an aggregate or overall power phase load profile for any or all of the three power supply phases powering the managed scope. The CPUDC can instruct the LPDUC to change the power phase coupling to circuit or equipment load on any or all PDUs under management scope to achieve best possible power phase load balance. Phase load balance can be achieved at various aggregation levels for e.g. each PDU level, each circuit level, each premise level, or aggregate multi-premises level. CPDUC and LPDUC can make these power phase to load coupling changes in real time without the need for a power down of the circuits or equipment load supplied through PDUs. The CPDUC and LPDUC interact using authentication and encryption based security model to protect managed scope from undesirable activity from hackers.

LPDUC is a device that is embedded in each power distribution unit (PDU). The LPDUC can gather and send load data for any or all of the three phases coupled to the PDU power sockets to the CPDUC in a secure way. The LPDUC controls the coupling of the power phases to the PDU power sockets and through that to the circuit or equipment load connected to the power socket. The power supply phase coupling to the PDU power sockets is managed using an embedded Software Controlled Power Switch Matrix (SCPSM). To achieve load balancing on supply phases, the CPDUC instructs the LPDUC on changes needed to power phase coupling to PDU power sockets and the LPDUC uses the SCPSM to realize the changes needed. The LPDUC can change phase couplings in real time without the need to power down the load i.e. non-disruptively. The CPDUC can control power supply phase coupling to any or all sockets of any or all PDUs under its scope of management working with the LPDUCs in a secure and authenticated way.

PDUs are used to supply power to circuits in a floor/building or equipment in a rack. Each PDU has power sockets to which power circuits or equipment loads are connected. Each socket can be powered by one or multiple phases of power depending on power draw requirements (e.g. line to line or line to neutral configuration). There could be a plurality of PDUs supplying a plurality of circuits or equipment in a plurality of premises. PDU houses the LPDUC and the SCPSM to enable dynamic and real time changes of power phases coupling to each power socket supplying power to a circuit or an equipment load.

Management scope at which power phase load balancing is conducted is configurable at the CPDUC. Different levels could be configured as management scope for power phase load balancing with associated priorities. At the PDU level, power supply phases are coupled to equipment loads through contained power sockets in a manner that achieves the best power phase load balancing possible at the PDU level. At a Circuits level, the power phase coupling to load at each PDU associated with the Circuits is maintained in a manner that achieves the best possible power phase load balancing at the aggregate Circuits level. At the Premises level the power phase coupling to load at each PDU associated with the Premises is maintained in a manner that achieves the best possible power phase load balancing at the aggregate Premises level. Each management scope level shall be assigned a priority at the CPUDC to indicate order of importance of achieving power phase load balancing at a particular level. The CPDUC shall use Scope and Priority information to achieve desired power phase load balancing working with the LPDUCs resident in the PDUs contained in its managed scope.

Power phase load balancing at the CPDUC can be conducted in multiple modes. In the manual mode, the CPDUC works to gather power phase load data at the level configured as management scope. It can also gather power phase load data, on demand, at each level contained in the managed scope i.e. PDU level, circuit level, or premise level. This shall be used by power administrators to study power phase loading and implement manual changes on power phase coupling to load at any or all levels mentioned above. CPDUC shall provide validation through simulation that power phase coupling changes about to be implemented will achieve better power phase load balancing. CPDUC shall work with all the LPDUC in its management scope to realize needed power phase changes, implemented by the power administrator, and provide confirmation of successful completion. It shall be possible to schedule when changes should be applied to provide for specific maintenance windows and flexibility of operation. In the automated mode, the CPDUC can gather power phase load data at each level in managed scope and then based on priorities configured for each level automatically generate needed changes in power phase coupling to load at each level to achieve best possible power phase load balancing at the managed scope. Machine learning and linear programming techniques shall be used as underlying techniques to study current power phase loads and then generate needed changes at each level to realize best possible power phase load balancing for the managed scope. In one or more embodiments, it shall be possible to configure when and how frequently automated mode scan of power phase loading runs to provide flexibility of operation.

Figure 2B:
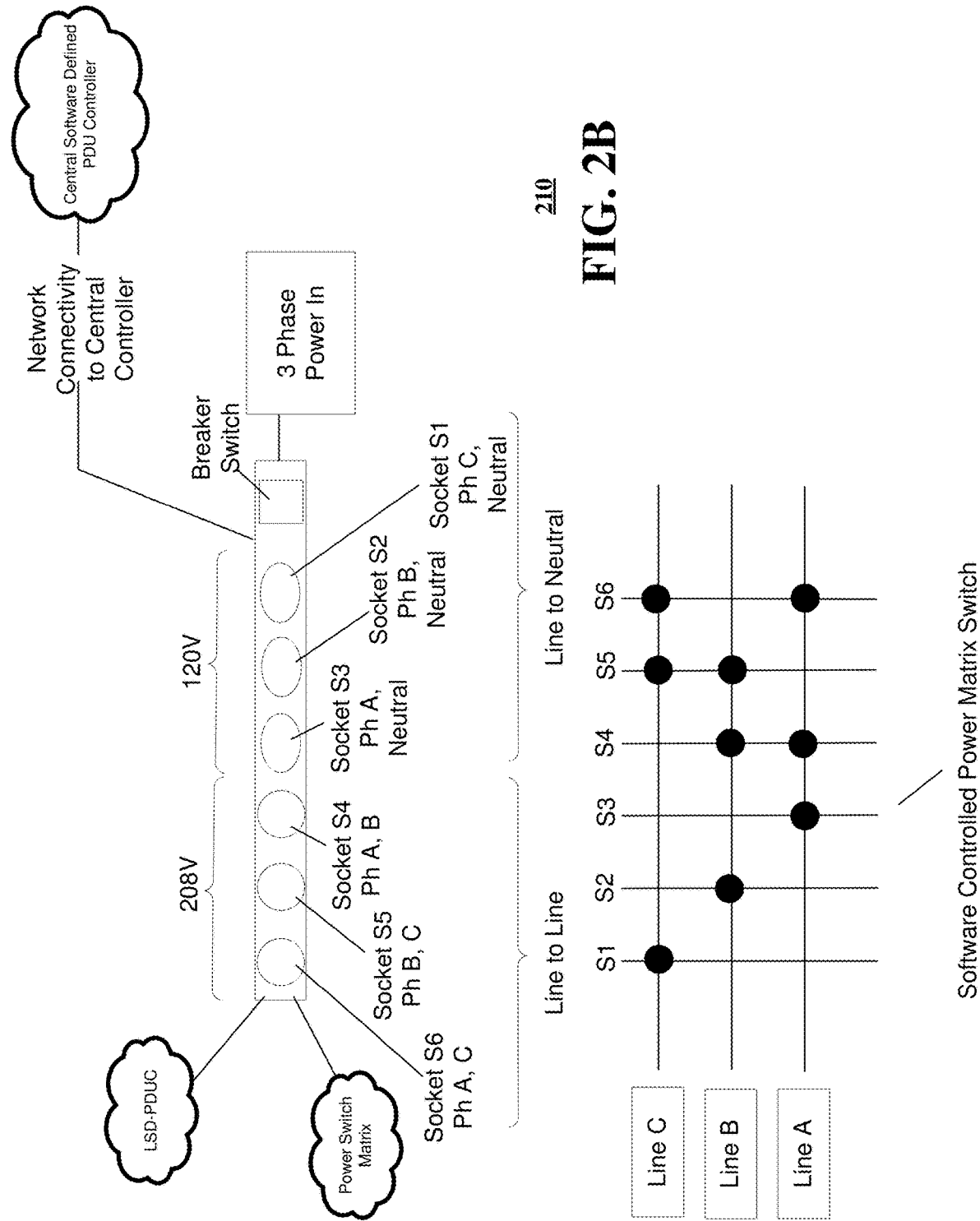

FIG. 2B is a block diagram illustrating an example, non-limiting embodiment of a system 210 functioning within the communication network of FIG. 1 in accordance with various aspects described herein. The system 210 can include a power distribution unit (PDU) that includes six sockets, a breaker switch and a three phase power input as well as network connectivity to a CSD PDU controller. The PDU can include a LSD-PDU controller and a software controlled power switch matrix. Sockets S1, S2, S3 are coupled to single phase power. Each socket S1, S2, S3 are provided 120 volts. Socket S1 is coupled to power phase C to neutral. Socket S2 is coupled to power phase B to neutral. Socket S3 is coupled to power phase A to neutral. Sockets S4, S5, S6 are coupled to three phase power. Each socket S4, S5, S6 are provided 208 volts. Socket S4 is coupled to power phase A to power phase B. Socket S5 is coupled to power phase B to power phase C. Socket S6 is coupled to power phase A to power phase C. Further, the software controlled power matrix switch includes inputs from lines of each power phase A, B, C. Further, the software controlled power switch matrix includes lines to each of the six sockets S1, S2, S3, S4, S5, S6. The software controlled power switch matrix coupled power phase C to socket S1, power phase B to socket S2, power phase A to socket S3, power phase B and A to socket S4, power phase C and B to socket S5, power phase C and A to socket S6.

The LSD-PDUC, PSM, and CSD-PDUC control the power phase couplings to the sockets S1-S6 to load balance the equipment within the management scope as described herein.

Figure 2C:
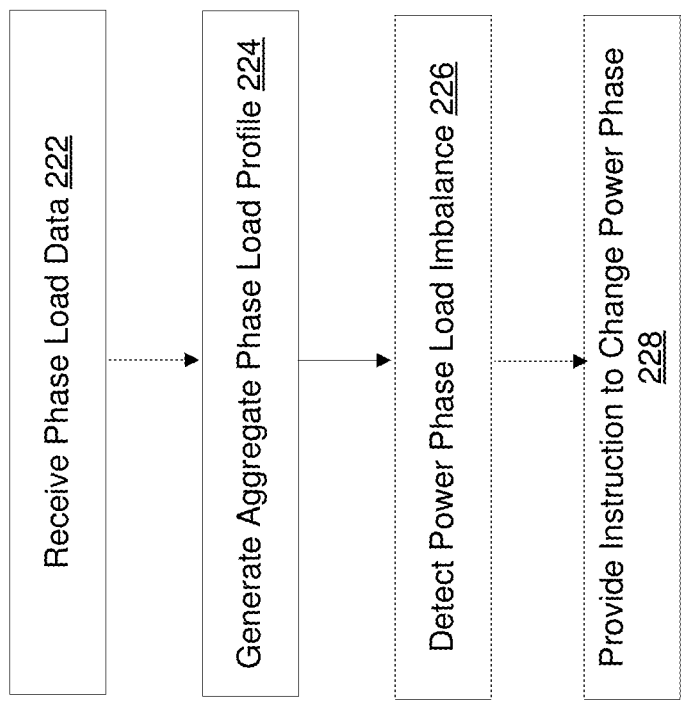
FIG. 2C depicts an illustrative embodiment of a method in accordance with various aspects described herein.

FIG. 2C depicts an illustrative embodiment of a method 220 in accordance with various aspects described herein. In one or more embodiments, a CPDUC can implement all or portions of the method 220 within a system comprising a plurality of PDUs, each of the PDUs comprising a LPDUC embedded therein, each of the PDUs comprising a SCPSM embedded therein, and a CPDUC, wherein a managed scope of the CPDUC comprises the plurality of PDUs supplying a plurality of circuits or equipment loads in a plurality of premises. The method 220 can include, at 2222, the CPDUC receiving phase load data from the LPDUC for each power socket of each PDU located in the managed scope. Further, the method 220 can include, at 224, the CPDUC generating an aggregate power phase load profile for one or more of three power supply phases powering the managed scope based on the phase load data received from the LPDUC for each power socket of each PDU located in the managed scope. In addition, the method 220 can include, at 226, the CPDUC detecting a power phase load imbalance within the managed scope. Also, the method 220 can include, at 226, the CPDUC providing instructions to at least one LPDUC to change a power phase coupled to the plurality of circuits or equipment loads supplied by at least one of the plurality of PDUs within the managed scope to improve the power phase load imbalance in real time. The at least one LPDUC utilizes the SCPSM to change a physical coupling of the power phase to the plurality of circuits or equipment loads without a need for a power down of the plurality of circuits or equipment loads supplied through the affected PDU affected by the phase coupling changes.

In one or more embodiments, the providing of the instructions to improve the power phase load imbalance comprises providing the instructions using a manual mode, which allows a power administrator to implement manual changes on power phase couplings to circuit or equipment load within the managed scope. The change to the power phase couplings is validated through simulation by the CPDUC.

In one or more embodiments, the providing of the instructions to improve the power phase load imbalance comprises providing the instructions using an automated mode. The automated mode gathers phase load data and detects any phase load imbalances and provides the instructions automatically to change the power phase coupled to the plurality of circuits or equipment loads within the managed scope based on priorities configured for each level in the managed scope. In some embodiments, the automated mode can be conducted using machine learning techniques. In other embodiments, the automated mode is conducted using linear programming techniques.

In one or more embodiments, the method 220 can include configuring a frequency and time of use of the automated mode to provide flexibility of operation. In some embodiments, the CPDUC and LPDUC interact using authentication and encryption. In further embodiments, the instructions are generated based on phase load balancing among various aggregation levels in the managed scope. The various levels comprise each PDU level, each circuit level, each floor level, each premises level, or aggregate multi-premises level. In additional embodiments, each power socket is powered by one or multiple phases of power depending on power draw requirements according to a line to line configuration, or a line to neutral configuration.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. Further, portions of embodiments described herein can be combined with portions of other embodiments described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of systems 200, 210 and method 220 presented in FIGS. 1, 2A, 2B, 2C, and 3.

In one or more embodiments, virtualized network function cloud can be implemented by a communication network that comprises one or more operations centers that include premises equipment. In one or more embodiments, communications network 100 comprises one or more data centers that include premises equipment. In addition, the premises equipment are coupled to a power distribution unit that comprises a software controller power matrix switch. Power distribution units provide power and monitor the phase loading due to a plurality of premises circuits and equipment. Further, CPDUC can communicate with the SCPSM through the LPDUC to adjust load from premises circuits and equipment on power supply phases.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a virtual network element 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as virtual network elements 330, 332 or 334. These network elements can be included in transport layer 350.

The virtualized network function cloud 325 interfaces with the transport layer 350 to provide the virtual network elements 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, virtualized network elements 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNE 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4A:
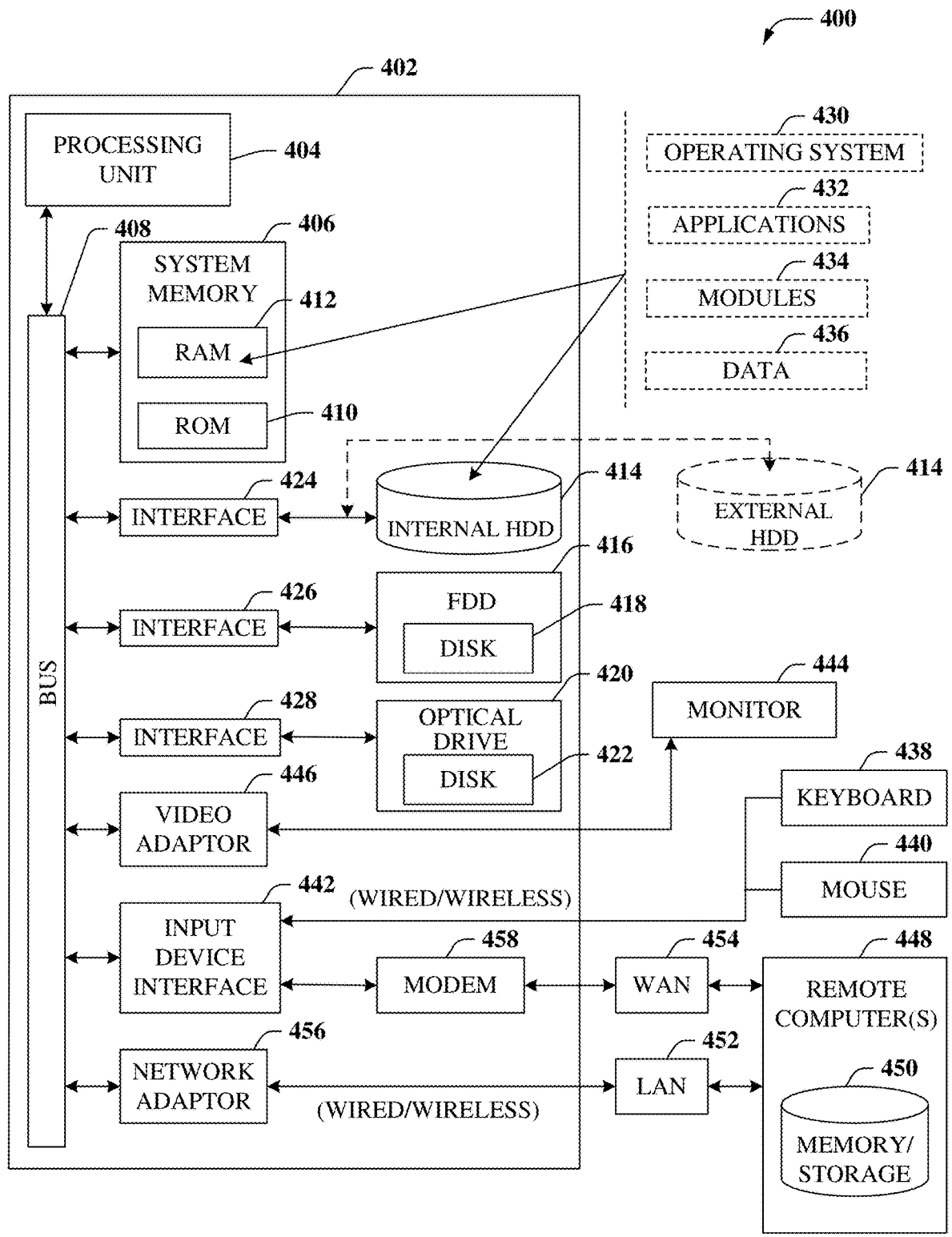
FIGS. 4A-4B are block diagrams of examples, non-limiting embodiments of a computing environment in accordance with various aspects described herein.

Turning now to FIG. 4A, there is illustrated a block diagram of a computing environment in accordance with various aspects described herein. In order to provide additional context for various embodiments of the embodiments described herein, FIG. 4A and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or virtual network elements 330, 332, 334, etc. as well as CPDUC (software). Each of these devices can be implemented via computer-executable instructions that can run on one or more computers, and/or in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4A, the example environment can comprise a computer 402, the computer 402 comprising a processing unit 404, a system memory 406 and a system bus 408.

In one or more embodiments, a computing device. In one or more embodiments, computing device shall host a CPDUC which shall be implemented in software and will run on computer 400 described herein. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal hard disk drive 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The hard disk drive 414, magnetic disk drive 416 and optical disk drive 420 can be connected to the system bus 408 by a hard disk drive interface 424, a magnetic disk drive interface 426 and an optical drive interface 428, respectively. The interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the local network 452 through a wired and/or wireless communication network interface or adapter 456. The adapter 456 can facilitate wired or wireless communication to the LAN 452, which can also comprise a wireless AP disposed thereon for communicating with the wireless adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 4B:
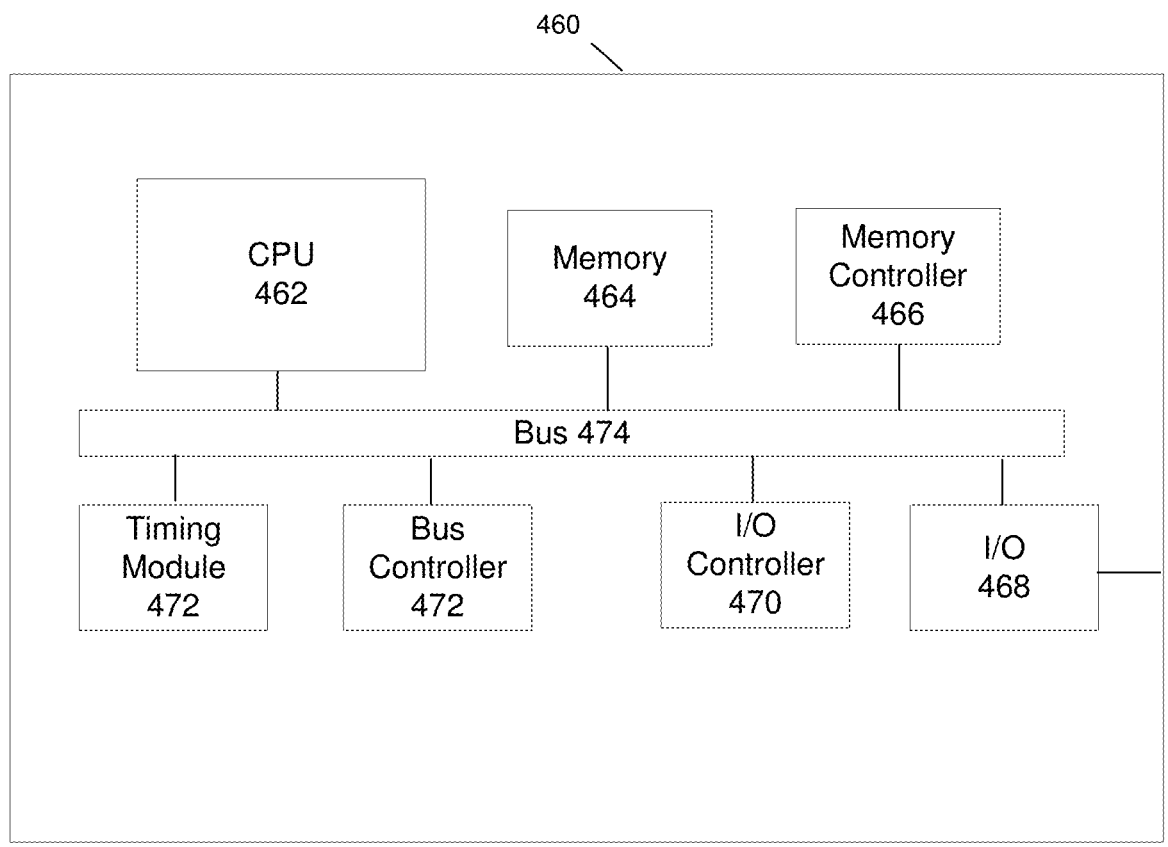

Referring to FIG. 4B, in one or embodiments, a system 460 comprises a single chip computer. System 460 comprises a central processing unit, a memory 464, memory controller 466, an input/out (I/O) module 468, I/O controller 470, bus controller 472, and a timing module 472, all of which can be communicatively coupled through a bus 474. Memory can include random access memory (RAM), read only memory (ROM), flash memory, or any other data storage device. A PDU can comprise an embodiment of a single chip computer or microcontroller such as system 460. Further, such a system 460 can be used to implement a LPDUC and control the SCPSM. SCPSM can be implemented through an application specific integrated circuit (ASIC).

Figure 5:
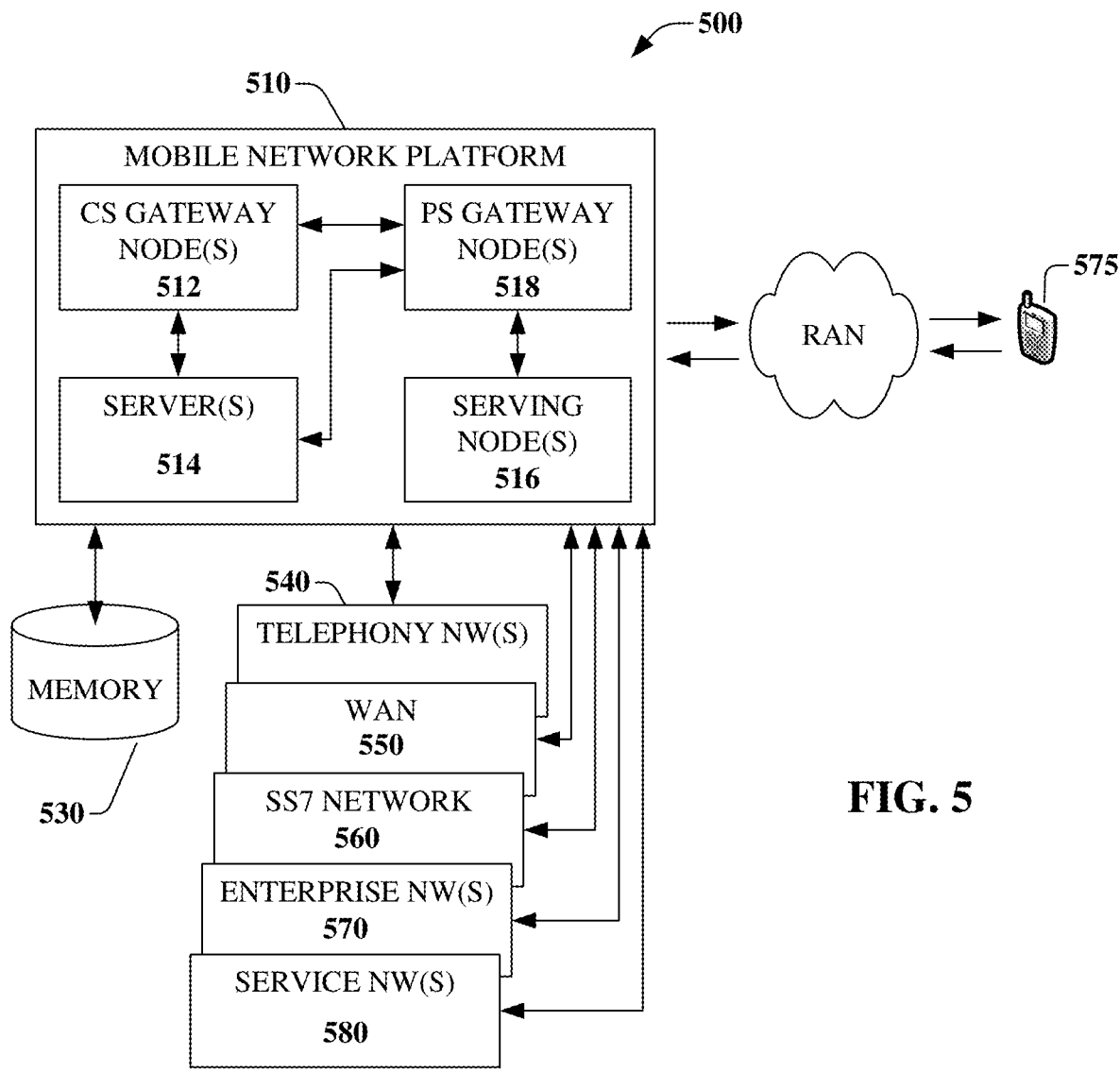
FIG. 5 is a block diagram of an example, non-limiting embodiment of a mobile network platform in accordance with various aspects described herein.

Turning now to FIG. 5, an embodiment 500 of a mobile network platform 510 (note, embodiments can also be applied in wireline, could artificial intelligence (AI), Internet of Things (IoT) and other applications) is shown that is an example of network elements 150, 152, 154, 156, and/or virtual network elements 330, 332, 334, etc. In one or more embodiments, the mobile network platform 510 comprises one or more data centers that include equipment. PDUs provide single phase or three phase power to the premises equipment and the CPDUC working with the LPDUC and the SCPSM help detect and balance any phase load imbalances.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
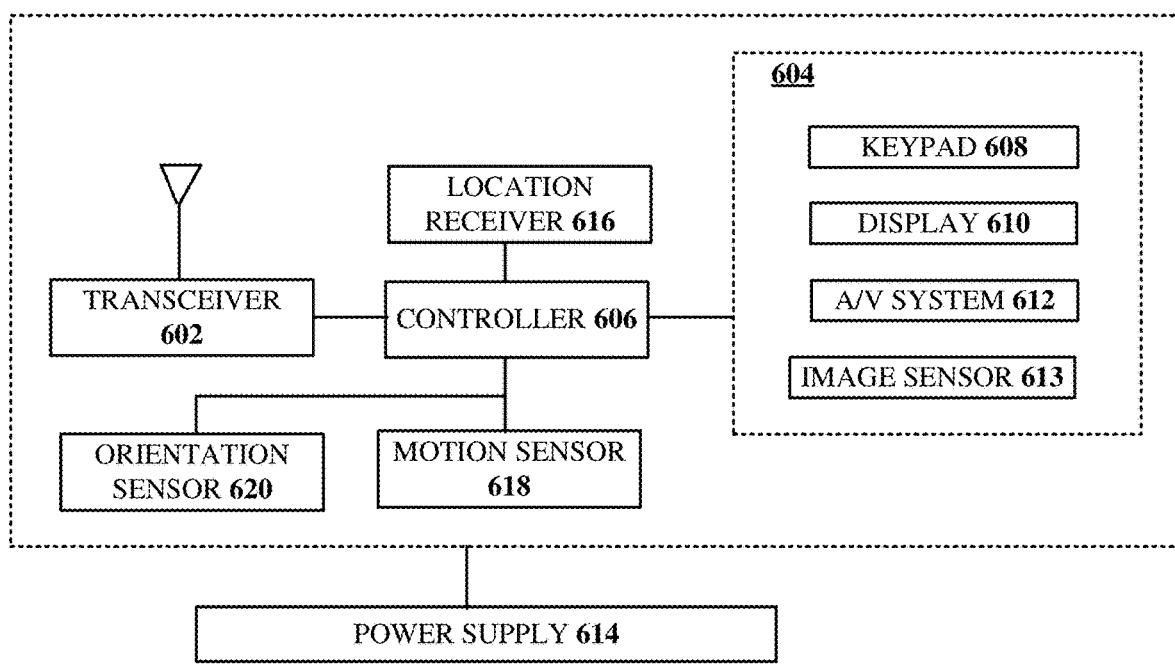
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. In other embodiments, the communication device 600 can be part of, or integrated in, a power distribution unit, software controller power matrix switch, or power distribution unit controllers, as described herein.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A system comprising:
   a plurality of power distribution units (PDUs), each of the PDUs comprising a local power distribution controller (LPDUC) embedded therein, each of the PDUs comprising a software controlled power switch matrix (SCPSM) embedded therein; and
   a central power distribution controller (CPDUC) comprising a processor, wherein a managed scope of the CPDUC comprises the plurality of PDUs supplying a plurality of circuits or equipment loads in a plurality of premises, wherein operations of the CPDUC comprise:
      configuring the CPDUC in an automated mode;
      in response to configuring the CPDUC in the automated mode:
         receiving phase load data from the LPDUC for each power socket of each PDU located in the managed scope;
         generating an aggregate power phase load profile for one or more of three power supply phases powering the managed scope based on the phase load data received from the LPDUC for each power socket of each PDU located in the managed scope;
         detecting a power phase load imbalance within the managed scope;
         identifying a plurality of levels within the managed scope, wherein each of the plurality of levels is associated with a portion of the plurality of PDUs;
         determining a priority for each of the plurality of levels within the managed scope resulting in a plurality of priorities;
         determining a change in power phase coupled to the plurality of circuits or the equipment loads supplied by at least one of the plurality of PDUs within the managed scope based on the plurality of priorities;
      configuring the CPDUC in a manual mode;
      in response to configuring the CPDUC in the manual mode:
         receiving user-generated input that indicates changing the power phase coupled to the plurality of circuits or the equipment supplied by at least one of the plurality of PDUs within the managed scope;
         in response to receiving the user-generated input, determining a change in power phase coupled to the plurality of circuits or the equipment loads supplied by at least one of the plurality of PDUs within the managed scope based on the user-generated input to improve the power phase load imbalance in real time;
         validating the change to the power phase through simulation by the CPDUC; and
         in response to the validating, providing instructions to at least one LPDUC to change the power phase coupled to the plurality of circuits or the equipment loads supplied by the at least one of the plurality of PDUs within the managed scope to improve the power phase load imbalance in real time, wherein the at least one LPDUC utilizes the SCPSM to change a physical coupling of the power phase to the plurality of circuits or the equipment loads without a need for powering down of the plurality of circuits or the equipment loads supplied through an affected PDU affected by the phase coupling changes.

2. The system of claim 1, wherein the providing of the instructions to improve the power phase load imbalance comprises providing the instructions that allow a power administrator to implement manual changes on power phase couplings within the managed scope.

3. The system of claim 1, wherein the providing of the instructions to improve the power phase load imbalance comprises providing the instructions based on the plurality of priorities for the plurality of levels in the managed scope.

4. The system of claim 3, wherein the automated mode is conducted using machine learning techniques.

5. The system of claim 3, wherein the automated mode is conducted using linear programming techniques.

6. The system of claim 3, wherein the operations further comprise configuring a frequency and time of use of the automated mode to provide flexibility of operation.

7. The system of claim 1, wherein the CPDUC and the LPDUC interact using authentication and encryption.

8. The system of claim 1, wherein the instructions are generated based on load balancing among various aggregation levels in the managed scope, wherein the various aggregation levels comprise each PDU level, each circuit level, each floor level, each premises level, or aggregate multi-premises level.

9. The system of claim 1, wherein each power socket is powered by one or multiple phases of power depending on power draw requirements according to a line to line configuration, or a line to neutral configuration.

10. A non-transitory, machine-readable medium, comprising executable instructions that, when executed by a central power distribution controller (CPDUC) comprising a processor, facilitates performance of operations, the operations comprising:
    configuring the CPDUC in an automated mode;
    in response to configuring the CPDUC in the automated mode:
        receiving phase load data from a local power distribution controller (LPDUC) for each power socket of each power distribution unit (PDU) located in a managed scope, wherein the CPDUC communicates with a plurality of power distribution units (PDUs), each of the PDUs comprising the LPDUC embedded therein, each of the PDUs comprising a software controlled power switch matrix (SCPSM) embedded therein, wherein the managed scope of the CPDUC comprises the plurality of PDUs supplying a plurality of circuits or equipment loads in a plurality of premises;
        generating an aggregate power phase load profile for one or more of three power supply phases powering the managed scope based on the phase load data received from the LPDUC for each power socket of each PDU located in the managed scope;
        detecting a power phase load imbalance within the managed scope;
        identifying a plurality of levels within the managed scope, wherein each of the plurality of levels is associated with a portion of the plurality of PDUs;
        determining a priority for each of the plurality of levels within the managed scope resulting in a plurality of priorities;
        determining a change in power phase coupled to the plurality of circuits or the equipment loads supplied by at least one of the plurality of PDUs within the managed scope based on the plurality of priorities;
    configuring the CPDUC in a manual mode;
    in response to configuring the CPDUC in the manual mode:
        receiving user-generated input that indicates changing the power phase coupled to the plurality of circuits or the equipment supplied by at least one of the plurality of PDUs within the managed scope;
        in response to receiving the user-generated input, determining a change in power phase coupled to the plurality of circuits or the equipment loads supplied by at least one of the plurality of PDUs within the managed scope based on the user-generated input to improve the power phase load imbalance in real time;
    validating the change to the power phase through simulation by the CPDUC; and
    in response to the validating, providing instructions to at least one LPDUC to change a power phase coupled to the plurality of circuits or the equipment loads supplied by at least one of the plurality of PDUs within the managed scope to improve the power phase load imbalance in real time, wherein the at least one LPDUC utilizes the SCPSM to change a physical coupling of the power phase to the plurality of circuits or the equipment loads without a need for powering down of the plurality of circuits or the equipment loads supplied through an affected PDU affected by the phase coupling changes.

11. The non-transitory, machine-readable medium of claim 10, wherein the providing of the instructions to improve the power phase load imbalance comprises providing the instructions that allow a power administrator to implement manual changes on power phase couplings within the managed scope.

12. The non-transitory, machine-readable medium of claim 10, wherein the providing of the instructions to improve the power phase load imbalance comprises providing the instructions based on the plurality of priorities for the plurality of levels in the managed scope.

13. The non-transitory, machine-readable medium of claim 12, wherein the automated mode is conducted using machine learning techniques.

14. The non-transitory, machine-readable medium of claim 12, wherein the automated mode is conducted using linear programming techniques.

15. The non-transitory, machine-readable medium of claim 12, wherein the operations further comprise configuring a frequency and time of use of the automated mode to provide flexibility of operation.

16. A method, comprising:
    configuring, by a central power distribution controller (CPDUC) including a processor, the CPDUC in an automated mode;
    in response to configuring the CPDUC in the automated mode:
        receiving, by the CPDUC, phase load data from a local power distribution controller (LPDUC) for each power socket of each power distribution unit (PDU) located in a managed scope, wherein the CPDUC communicates with a plurality of power distribution units (PDUs), each of the PDUs comprising the LPDUC embedded therein, each of PDUs comprising a software controlled power switch matrix (SCPSM) embedded therein, wherein the managed scope of the CPDUC comprises the plurality of PDUs supplying a plurality of circuits or equipment loads in a plurality of premises;
        generating, by the CPDUC, an aggregate power phase load profile for one or more of three power supply phases powering the managed scope based on the phase load data received from the LPDUC for each power socket of each PDU located in the managed scope;

detecting, by the CPDUC, a power phase load imbalance within the managed scope;

identifying, by the CPDUC, a plurality of levels within the managed scope, wherein each of the plurality of levels is associated with a portion of the plurality of PDUs;

determining, by the CPDUC, a priority for each of the plurality of levels within the managed scope resulting in a plurality of priorities;

determining, by the CPDUC, a change in power phase coupled to the plurality of circuits or the equipment loads supplied by at least one of the plurality of PDUs within the managed scope based on the plurality of priorities;

configuring, by the CPDUC, the CPDUC in a manual mode;

in response to configuring the CPDUC in the manual mode:

receiving, by the CPDUC, user-generated input that indicates changing the power phase coupled to the plurality of circuits or the equipment supplied by at least one of the plurality of PDUs within the managed scope;

in response to receiving the user-generated input, determining, by the CPDUC, a change in power phase coupled to the plurality of circuits or the equipment loads supplied by at least one of the plurality of PDUs within the managed scope based on the user-generated input to improve the power phase load imbalance in real time;

validating, by the CPDUC, the change to the power phase through simulation by the CPDUC; and in response to the validating, providing, by the CPDUC, instructions to at least one LPDUC to change a power phase coupled to the plurality of circuits or the equipment loads supplied by at least one of the plurality of PDUs within the managed scope to improve the power phase load imbalance in real time, wherein the at least one LPDUC utilizes the SCPSM to change a physical coupling of the power phase to the plurality of circuits or the equipment loads without a need for powering down of the plurality of circuits or the equipment loads supplied through an affected PDU affected by the phase coupling changes.

17. The method of claim 16, wherein the providing of the instructions to improve the power phase load imbalance comprises providing, by the CPDUC, the instructions that allows a power administrator to implement manual changes on power phase couplings within the managed scope.

18. The method of claim 16, wherein the providing of the instructions to improve the power phase load imbalance comprises providing, by the CPDUC, the instructions based on the plurality of priorities for the plurality of levels in the managed scope.

19. The method of claim 18, wherein the automated mode is conducted using machine learning techniques.

20. The method of claim 18, wherein the automated mode is conducted using linear programming techniques.

* * * * *